United States Patent
Cantwell et al.

(10) Patent No.: US 8,284,942 B2
(45) Date of Patent: Oct. 9, 2012

(54) PERSISTING PRIVATE/PUBLIC KEY PAIRS IN PASSWORD-ENCRYPTED FILES FOR TRANSPORTATION TO LOCAL CRYPTOGRAPHIC STORE

(75) Inventors: James Gordon Cantwell, Sammamish, WA (US); John Joseph Rivard, Redmond, WA (US); Sean Conway Draine, Seattle, WA (US); Svetlozar Emilov Keremidarski, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1224 days.

(21) Appl. No.: 10/925,284

(22) Filed: Aug. 24, 2004

(65) Prior Publication Data

US 2006/0059350 A1   Mar. 16, 2006

(51) Int. Cl.
*H04L 9/32* (2006.01)
(52) U.S. Cl. .......................... 380/277; 713/176; 726/26
(58) Field of Classification Search .................. 713/176; 380/277, 278; 726/26
See application file for complete search history.

(56) References Cited

U.S. PATENT DOCUMENTS

| | | | |
|---|---|---|---|
| 5,799,086 A * | 8/1998 | Sudia | 705/76 |
| 5,825,300 A * | 10/1998 | Bathrick et al. | 340/5.74 |
| 5,862,325 A * | 1/1999 | Reed et al. | 709/201 |
| 5,892,828 A * | 4/1999 | Perlman | 713/183 |
| 5,982,898 A * | 11/1999 | Hsu et al. | 713/156 |
| 6,081,893 A * | 6/2000 | Grawrock et al. | 713/183 |
| 6,192,130 B1 * | 2/2001 | Otway | 380/277 |
| 6,260,141 B1 * | 7/2001 | Park | 713/155 |
| 6,330,677 B1 * | 12/2001 | Madoukh | 726/2 |
| 6,438,690 B1 * | 8/2002 | Patel et al. | 713/156 |
| 6,460,141 B1 * | 10/2002 | Olden | 726/4 |
| 6,694,025 B1 * | 2/2004 | Epstein et al. | 380/279 |
| 6,704,868 B1 * | 3/2004 | Challener et al. | 713/168 |
| 6,718,468 B1 * | 4/2004 | Challener et al. | 713/184 |
| 6,772,331 B1 * | 8/2004 | Hind et al. | 713/151 |
| 6,834,112 B1 * | 12/2004 | Brickell | 380/279 |
| 6,898,707 B1 * | 5/2005 | Sit et al. | 713/167 |
| 6,948,070 B1 * | 9/2005 | Ginter et al. | 713/193 |
| 7,000,108 B1 * | 2/2006 | Yarsa et al. | 713/167 |
| 7,120,802 B2 * | 10/2006 | Shear et al. | 713/194 |
| 7,389,536 B2 * | 6/2008 | Challener et al. | 726/22 |
| 7,395,436 B1 * | 7/2008 | Nemovicher | 713/193 |

(Continued)

OTHER PUBLICATIONS

Creating a Key Pair . . . NET Framework Developer's Guide. http://msdn2.microsoft.com/en-us/library/6f05ezxy(VS.71).aspx . 2007.*

(Continued)

*Primary Examiner* — Eleni Shiferaw
*Assistant Examiner* — Tamara Teslovich
(74) *Attorney, Agent, or Firm* — Woodcock Washburn LLP

(57) ABSTRACT

Systems and methods for using private keys in software development that minimizes the risks of the private key being lost or stolen. A strong name consists of the assembly's identity, e.g., its simple text name, version number, and culture information (if provided), plus a public key and a digital signature. It is generated from an assembly file using the corresponding private key. The private/public key pair is persisting in a password-encrypted file using a standard encryption format that can be made available to everyone. The first time any subsystem of the development environment requires use of the private key contained in an encrypted file format, the developer is prompted to provide the password to decrypt the key. The user supplies the password and the public/private key is imported into a non-exportable key container in the local cryptographic store.

14 Claims, 4 Drawing Sheets

U.S. PATENT DOCUMENTS

| | | | |
|---|---|---|---|
| 7,441,277 B2* | 10/2008 | Burges et al. | 726/29 |
| 7,602,910 B2* | 10/2009 | Johansson et al. | 380/44 |
| 7,925,898 B2* | 4/2011 | Shear et al. | 713/194 |
| 7,984,488 B2* | 7/2011 | Cross et al. | 726/6 |
| 7,996,673 B2* | 8/2011 | Ivanov et al. | 713/168 |
| 2002/0023213 A1* | 2/2002 | Walker et al. | 713/168 |
| 2002/0042884 A1* | 4/2002 | Wu et al. | 713/201 |
| 2002/0071565 A1* | 6/2002 | Kurn et al. | 380/281 |
| 2002/0095454 A1* | 7/2002 | Reed et al. | 709/201 |
| 2002/0129261 A1* | 9/2002 | Cromer et al. | 713/193 |
| 2002/0133396 A1* | 9/2002 | Barnhart | 705/12 |
| 2002/0144109 A1* | 10/2002 | Benantar et al. | 713/156 |
| 2002/0144119 A1* | 10/2002 | Benantar | 713/171 |
| 2002/0150241 A1* | 10/2002 | Scheidt et al. | 380/44 |
| 2002/0172367 A1* | 11/2002 | Mulder et al. | 380/277 |
| 2003/0105965 A1* | 6/2003 | Challener | 713/184 |
| 2003/0123671 A1* | 7/2003 | He et al. | 380/282 |
| 2003/0154376 A1* | 8/2003 | Hwangbo | 713/173 |
| 2004/0030887 A1* | 2/2004 | Harrisville-Wolff et al. | 713/155 |
| 2004/0117662 A1 | 6/2004 | Ong et al. | |
| 2004/0139309 A1 | 7/2004 | Gentil et al. | |
| 2004/0260652 A1* | 12/2004 | Rose | 705/51 |
| 2004/0268152 A1* | 12/2004 | Xia et al. | 713/201 |
| 2005/0081026 A1* | 4/2005 | Thornton et al. | 713/156 |
| 2005/0086531 A1* | 4/2005 | Kenrich | 713/201 |
| 2005/0120203 A1* | 6/2005 | Yeh et al. | 713/156 |
| 2005/0257057 A1* | 11/2005 | Ivanov et al. | 713/171 |
| 2005/0267844 A1* | 12/2005 | Gallant et al. | 705/51 |
| 2007/0203957 A1* | 8/2007 | Desai et al. | 707/204 |
| 2009/0055642 A1* | 2/2009 | Myers et al. | 713/155 |
| 2011/0296172 A1* | 12/2011 | Fu et al. | 713/156 |

OTHER PUBLICATIONS

Signing an Assembly with a Strong Name .NET Framework Developer's Guide. http://msdn2.microsoft.com/en-us/library/xc31ft41(vs.71).aspx . 2007.*

Strong-Named Assemblies .NET Framework Developer's Guide. http://msdn2.microsoft.com/en-us/library/wd40t7ad.aspx. 2007.*

Global Assembly Cache. NET Framework Developer's Guide. http://msdn2.microsoft.com/en-us/library/yf1d93sz.aspx. 2007.*

Keith Brown. Security Briefs: Strong Names and Security in the .NET Framework . . . NET Framework Security. http://msdn2.microsoft.com/en-us/library/Aa302416.aspx . Dec. 2003.*

Improving Web Application Security. Threates and Countermeasures. http://download.microsoft.com/download/d/8/c/d8c02f31-64af-438c-a9f4-e31acb8e3333/Threats_Countermeasures.pdf. Chapter 7 (p. 145-180), Jun. 30, 2003.*

PKCS #11 v2.11: Cryptographic Token Interface Standard. RSA Laboratories. 2001. ftp://ftp.rsasecurity.com/pub/pkcs/pkcs-11/v211/pkcs-11v2-11r1.pdf.*

RSA Laboratories. PKCS 12 v.1.0: Personal Information Exchange Syntax. Jun. 24 1999. pp. 1-23.*

Michel Gallant. PKCS #12 File Types: Portable Protected Keys in .Net. MSDN. Mar. 2004. pp. 1-11.*

* cited by examiner

Fig. 3

PERSISTING PRIVATE/PUBLIC KEY PAIRS IN PASSWORD-ENCRYPTED FILES FOR TRANSPORTATION TO LOCAL CRYPTOGRAPHIC STORE

FIELD OF THE INVENTION

This invention relates in general to the field of computer software. More particularly, this invention relates to a system and method of providing software developers with a way to store private keys used for signing assemblies and/or the installation of trusted components.

BACKGROUND OF THE INVENTION

One of the larger questions facing the software industry is how can users trust code that is published on the Internet. Packaged software uses branding and trusted sales outlets to assure users of its integrity, but these are not available when code is transmitted on the Internet. Additionally, there is no guarantee that the code has not been altered while being downloaded. While browsers typically exhibit a warning message explaining the possible dangers of downloading data, they do nothing to actually see whether the code is what it claims to be. A more active approach must be taken to make the Internet a reliable medium for distributing software.

One way to verify the authenticity of software is through the use of digital signatures. However, smaller developers find that digitally signing software is difficult because of the necessity to manage the private keys used to sign the code. This is because each developer needs access to the private key to run and debug applications. Further, if a key is compromised, other applications can use the private key to spoof the identity of the original application and thereby obtain unauthorized access to resources and privileges that had been granted to that application.

Thus, there is a need for a system of signing software applications that provides a globally unique, verifiable identity for a given application. There is also a need for a system for using private keys in software development that minimizes the risks of the private key being lost or stolen. There is a need for a simple, cost effective system that allows developers within a small team to safely share a private key while minimizing the risks of it being lost or stolen. The present invention provides such a solution.

SUMMARY OF THE INVENTION

The present invention is directed to systems and methods for storing a private key used for digitally signing software code. The method includes creating a private/public key pair; providing a password for the private/public key pair; persisting the private/public key pair in a file; entering the password a first time a development environment requires a private key in the private/public key pair to sign software code; and thereafter storing the private/public key pair in a cryptographic store. The file may be a personal information exchange syntax standard format.

According to a feature of the invention, the method includes naming the private/public key pair in the cryptographic store using a unique hash. In addition, the private/public key pair may be marked as non-exportable. Subsequent attempts to use the private key are redirected to the cryptographic store. In addition, a user interface may be provided to digitally sign the software code.

According to another aspect of the invention, there is provided a method for digitally signing software code using a private key provided in a password protected an encrypted key pair file. The method includes receiving the encrypted key pair file; providing a password for the key pair file; storing the key pair in a cryptographic store; and signing the software code using the private key from the cryptographic store.

In accordance with another aspect of the invention, there is provided a system for creating and digitally signing software. The system includes a key pair generating tool and an application programming interface for creating, retrieving, signing and importing a password protected key pair file. The key pair generation tool is adapted to create a key pair, and import, retrieve and display information about an existing key pair. The application programming interface is exposed to development tools to digitally sign software using a private key from the key pair file that is stored in a cryptographic store.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIGS. 2-4 are exemplary user interfaces for signing assemblies.

DETAILED DESCRIPTION OF PREFERRED EMBODIMENTS

Exemplary Computing Environment

Figure 1:
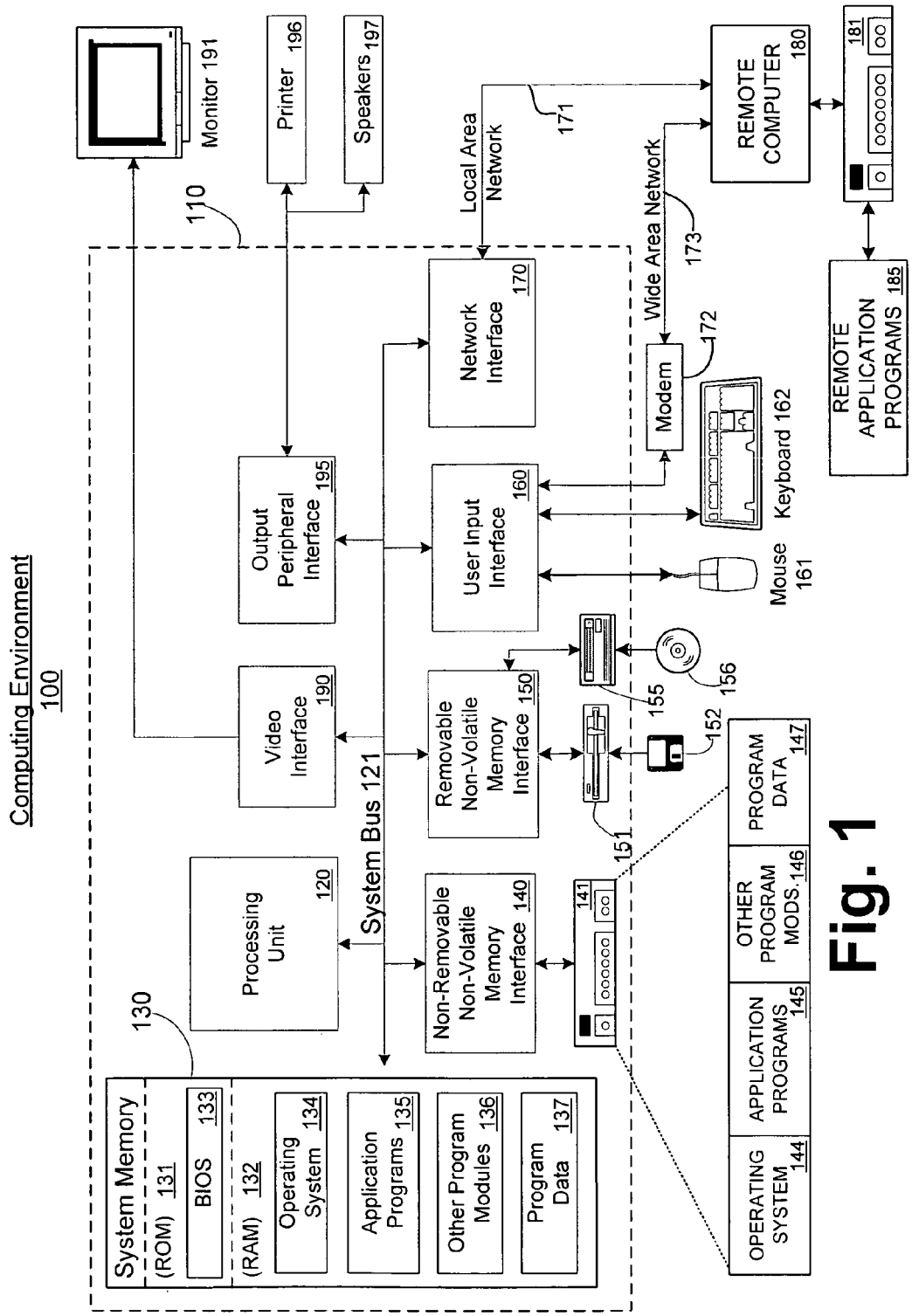
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), Peripheral Component Interconnect Express (PCI-Express), and Systems Management Bus (SMBus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Embodiments of Strong Names

The present invention is directed to a system and method for using private keys in software development that minimizes the risks of the private key being lost or stolen. The present invention will be described with reference to the MICROSOFT .NET Framework and development tools such as VISUAL STUDIO, available from Microsoft Corporation, Redmond, Wash. It is noted, however, that the present invention is not limited to such platforms or development tools and may be used with other platforms and development tools known to those of ordinary skill in the art.

Strong names uniquely identify an assembly, allowing it to be placed in the Global Assembly Cache, and also implement the versioning system in the MICROSOFT .NET Framework common language runtime. A strong name consists of the assembly's identity, e.g., its simple text name, version number, and culture information (if provided), plus a public key and a digital signature. It is generated from an assembly file using the corresponding private key. Because the strong name is based on a digital signature generated with a private key, it provides security against spoofing attacks where a malicious piece of code attempts to masquerade as another assembly.

The present invention improves upon prior methods by persisting the private/public key pair in a password-encrypted file using a standard encryption format (e.g., Personal Information Exchange Syntax Standard PKCS #12 (PFX file)) that can be made available to everyone. Because the key pair is persisted as a file, it can then be managed using the same methods and tools used for managing source code files (e.g., project systems, build systems, source code control systems) rather than conventional cumbersome key management systems. The same methods and tools used to avoid loss of source code files (e.g., periodic hard drive backups) can be employed to prevent the loss of the private key file.

Before the subsystem of the development environment creates a new key pair to be used for assembly signing, a password is supplied so that the public/private key pair can be encrypted into the file. The password is provided by the developer at the time the key is created and immediately discarded once the file is encrypted. The system first creates the public and private key pair, creates a temporary in-memory X509 Certificate, assigns the generated key pair to the certificate, and exports the key pair to a PFX file. The contents of the PFX file are encrypted using the user-supplied password. The PFX file is then added to the user's project where it can be maintained along with the application source code files.

The first time any subsystem of the development environment requires use of the private key contained in an encrypted file format, the subsystem computes the hash of the PFX file and attempts to use a key container in the local cryptographic store (e.g., the CryptoDB in the MICROSOFT WINDOWS operating system) having a name that matches that hash. If no such key container exists, the developer is prompted to provide the password to decrypt the key. The user supplies the password and the PFX file is decrypted and imported into a temporary in-memory X509 certificate. The public/private key pair is then extracted from certificate and imported into a non-exportable key container in the local cryptographic store named based on a hash of the encrypted key file. It is preferable that the key pair is imported into the CryptoDB as non-exportable to further protect the key contents.

Subsequent attempts to use the key from that users account on that machine are then automatically directed to the named container so that the key can be used without requiring the developer to re-enter the password. When signing with an encrypted key file, the system first computes the hash of the file and checks if the key container named after the hash exists in the default RSA CSP. If so, the signing continues using the specified key container name. During signing, the key pair contents of the encrypted key file are not used, only the installed key pair in the Crypto database. The invention thereby enables a single developer or a team of developers to easily and safely share a private key across different computers and user accounts without the inconvenience of being repeatedly prompted for a password.

The present invention uses established APIs for generating key pairs, creating certificates, exporting certificates to PFX files, importing PFX files to certificates, and importing key pairs to the cryptographic store. The present invention advantageously uses the PFX standard, which means that the encrypted key file is interoperable with existing infrastructure for storing keys and certificates, as well as signing code. For example, the PFX file can be used with command line tools such as sn.exe, a code signing utility provided by the MICROSOFT .NET Framework, or signcode.exe another code signing utility supported by the WINDOWS operating system. The PFX file could also be imported into the WINDOWS Certificate Store, where it can be accessed and used through established WINDOWS APIs. The certificate can also be imported into the WINDOWS Trusted Publishers list in order to establish policy trusting applications signed with the certificate.

Figure 2:
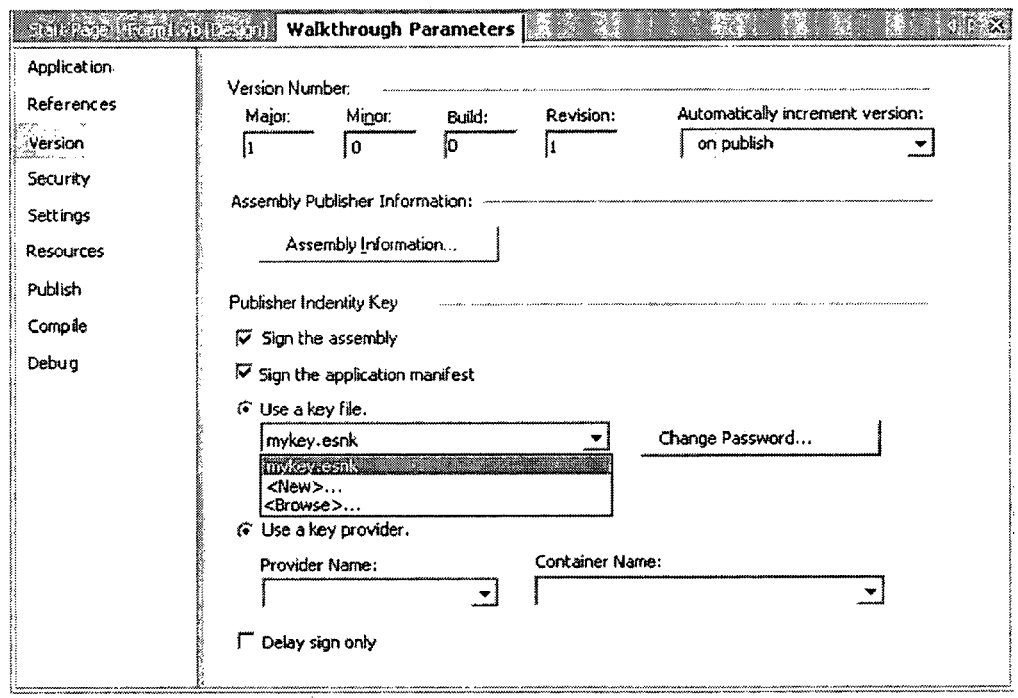

Referring now to FIG. 2, there is illustrated an exemplary user interface for versioning and signing assemblies. As shown in FIG. 2, the user can specify the full version number of the assembly. This version number may also be used for the deployment and application manifests generated by VISUAL STUDIO. The developer can optionally choose to automatically increment the Revision number. Choices in the drop-down include: never, on Build, on Release Build and on Publish.

Figure 3:
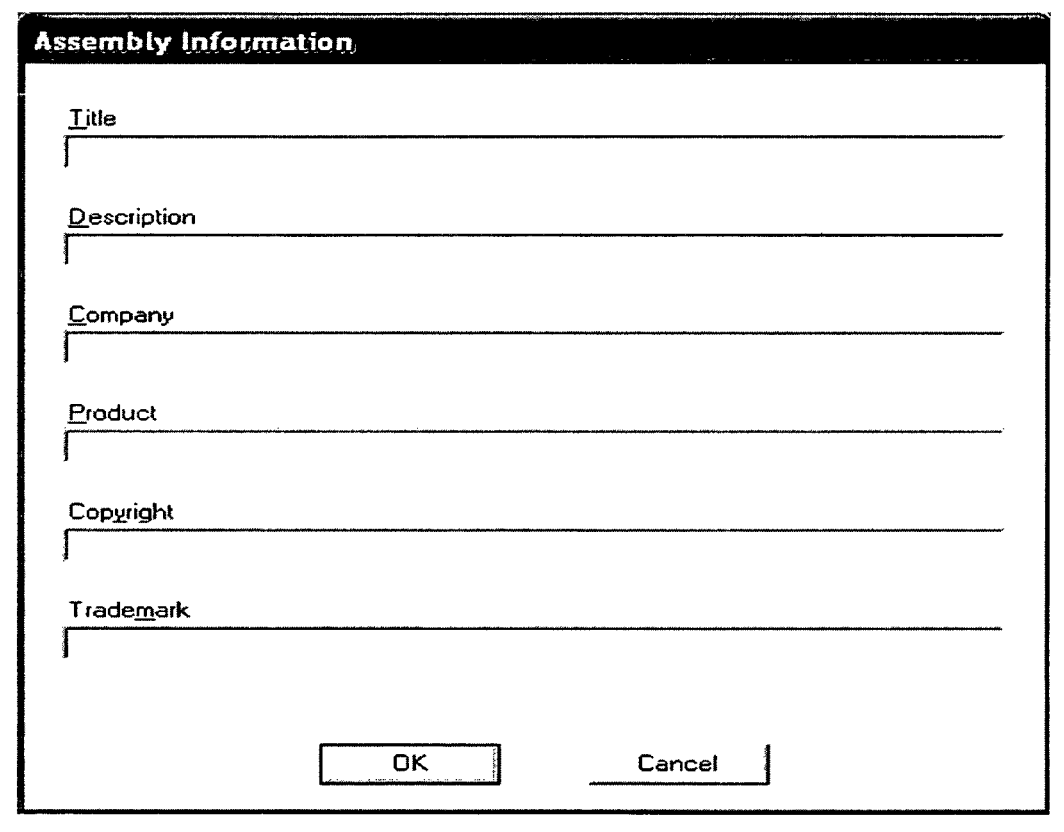

Pressing the Assembly Information button launches the dialog show in FIG. 3 for editing publisher Assembly Information. Here, relevant information may be added by the developer.

Referring again to FIG. 2, the Publisher Identity Key section specifies whether and how the application should sign the assembly and application manifest. If Sign the Assembly is checked, the assembly is signed. If Sign the Application Manifest is checked, the application and deployment manifest is signed. The developer can specify an encrypted or unencrypted key file to sign (or delay sign) the assembly via the "Use a key file" entry. The dropdown lists all previous keys created with VISUAL STUDIO, and it allows the developer to browse to an existing key file or create a new key file. If the developer has selected an encrypted key file, the Change Password button is, enabled and allows them to specify a new password with which to encrypt the key.

Figure 4:
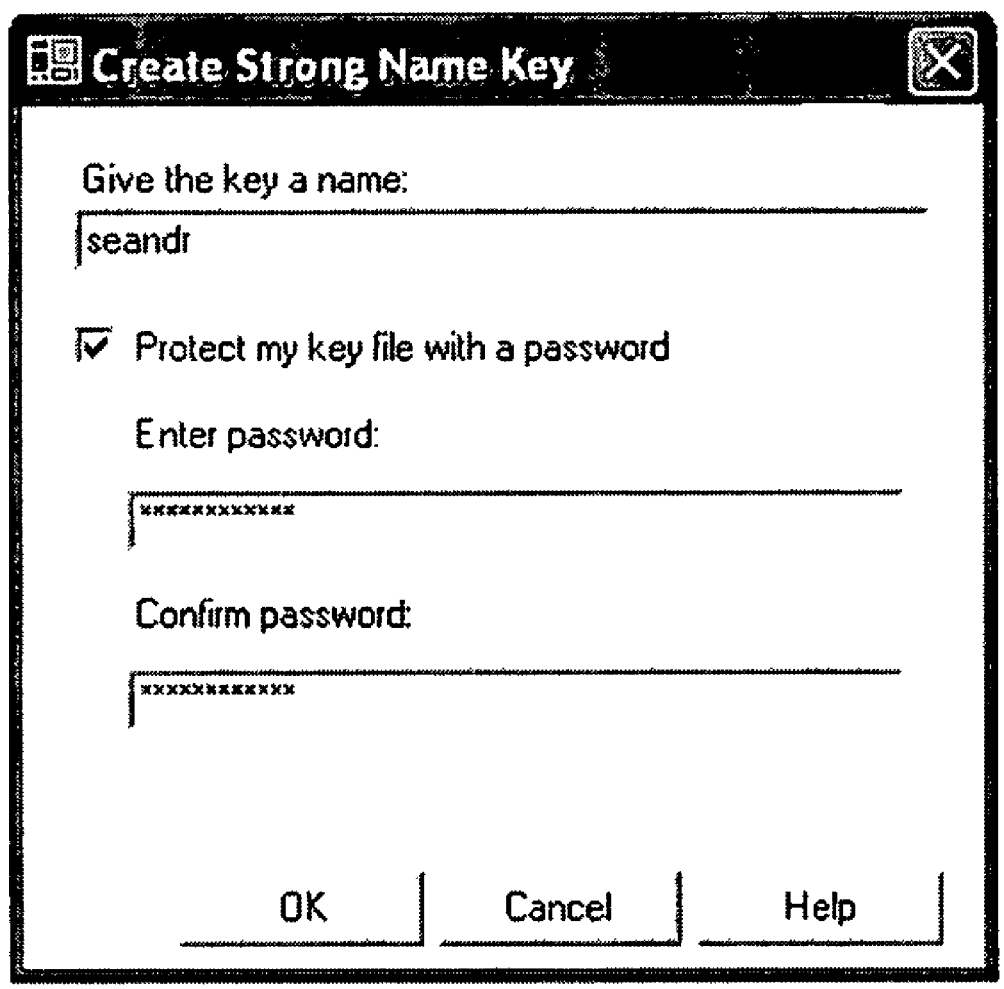

If the developer chooses the <new> . . . option under the "Use a key file" entry, they can create a new key using the dialog of FIG. 4. In this dialog, the user provides a Strong Key name and password. The resulting key is automatically added to the project and stored by VISUAL STUDIO for use with future projects.

The option "Use a key provider" allows the developer to sign using a key from a container in the local crypto database. This allows the developer to sign using key management devices such as smart cards and lockboxes that expose their keys through the standard crypto APIs. The provider dropdown enumerates all of the providers on the local machine. The name dropdown enumerates all of the container names within the provider.

The option "Delay sign only" allows the developer to delay sign the assembly, in which case the selected key file or container need only contain the public portion of the key pair.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for digitally signing software code, the method comprising:
   creating a private/public key pair;
   exporting the private/public key pair to a PFX file;
   using a user-supplied password for encrypting the PFX file;
   adding the encrypted PFX file with the private/public key pair therein to a user's project contained in a first machine;
   managing the encrypted PFX file using file-managing tools that are used for managing files in said first machine;
   responsive to a first time user attempt to use the private key for signing software code on said first machine, utilizing said user-supplied password to decrypt said encrypted PFX file and access said private/public key pair contained therein;
   moving said private/public key pair into a non-exportable key container in a local cryptographic store of said first machine, the non-exportable key container store configured to prevent export of said private/public key pair from said first machine; and
   automatically directing subsequent user attempts to use said private key to said non-exportable key container rather than to said encrypted PFX file, so that said private key can be used without re-entry of said user-supplied password each time use of said private key is desired.

2. The method of claim 1, wherein storing said private/public key pair in said non-exportable key container comprises:
   generating a hash of said encrypted PFX file; and
   assigning a name to said private/public key pair in said local cryptographic store, wherein said name matches said hash.

3. The method of claim 2, further comprising marking said private/public key pair as non-exportable.

4. The method of claim 1, wherein only the public key of the private/public key pair is stored in said local cryptographic store, thereby permitting said user to delay signing said software code with said private key.

5. The method of claim 1, further comprising providing a user interface to digitally sign said software code.

6. A method for digitally signing software code using a private key the method comprising:
   receiving in a first machine, a password-protected encrypted key pair file with a private/public key pair contained therein;
   adding said encrypted key pair file to a user's project contained in said first machine;
   managing said encrypted key pair file using file-managing tools that are used for managing files in said first machine;
   utilizing a user-supplied password for decrypting said password-protected encrypted key pair file to access said private/public key pair;
   moving said private/public key pair into a non-exportable key container in a local cryptographic store of said first machine, the non-exportable key container configured to prevent export of said private/public key pair from said first machine; and
   automatically directing a subsequent user attempt to use said private key for signing said software code, to said non-exportable key container rather than to said password-protected encrypted key pair file without reentering said password each time use of said private key is desired.

7. The method of claim 6, wherein moving said private/public key pair into said cryptographic store comprises assigning a name to said private/public key pair using a hash, wherein said name matches said hash.

8. The method of claim 7, further comprising marking said private/public key pair as non-exportable.

9. The method of claim 6, further comprising providing a user interface to digitally sign said software code.

10. The method of claim 6, wherein said encrypted key pair file comprises a standard format for the exchange of encrypted information.

11. The method of claim 1, wherein automatically directing subsequent user attempts to said non-exportable key container comprises using a key management device of said local cryptographic store.

12. The method of claim 11, wherein using said key management device comprises using an API of said local cryptographic store.

13. The method of claim 12, wherein using said key management device comprises using a smart card via said API of said local cryptographic store.

14. The method of claim 13, wherein said API comprises a name dropdown interface that provides a list of container names to said user.

* * * * *